United States Patent [19]

Schulte-Schrepping et al.

[11] 3,721,729

[45] March 20, 1973

[54] PROCESS FOR THE SEPARATION OF CADMIUM AND NICKEL

[75] Inventors: Karl-Heinz Schulte-Schrepping, Bonn-Beuel; Lothar Kaufmann, Hennf/Sieg; Paul Tilp, Bonn-Beuel, all of Germany

[73] Assignee: Deutsche Gold-und Silber Scheideanstatt vormals Roessler, Frankfurt, Main, Germany

[22] Filed: Oct. 15, 1970

[21] Appl. No.: 81,184

[30] Foreign Application Priority Data

Jan. 17, 1970 Germany..................P 20 01 985.6

[52] U.S. Cl....................................423/105, 423/144
[51] Int. Cl. ............................................C01g 53/04
[58] Field of Search ....23/61, 183; 75/103, 108, 119, 75/121

[56] References Cited

UNITED STATES PATENTS 3,592,939   7/1971   Derry.....................................75/108
2,734,821   2/1956   Schaufelberger.....................75/108

*Primary Examiner*—Oscar R. Vertiz
*Assistant Examiner*—G. Alvaro
*Attorney*—Cushman, Darby & Cushman

[57] ABSTRACT

Cadmium and nickel are separated from an aqueous solution of their salts, which solution contains not over 200 grams per liter of cadmium and nickel, by adding ammonia, precipitating the cadmium as the carbonate with alkali carbonate, and heating the filtrate with alkali hydroxide to precipitate nickel as the hydroxide. The amount of ammonia depending on the amount of nickel in the range of 10 to 100 grams of nickel per liter is varied between 8 and 4 moles per liter.

13 Claims, No Drawings

PROCESS FOR THE SEPARATION OF CADMIUM AND NICKEL

The present invention is directed to a wet chemical process for the separation of cadmium and nickel which is distinguished from other processes by especial industrial economy and a wide range of use.

According to the state of the art the most frequently used method in practice for the separation of cadmium and nickel is the electrolytic separation of both metals. Under suitable conditions the cadmium can e separated from acid baths on the cathode while nickel remains in solution.

This process in a continuous operation is tied to high throughputs which permit an amortization of the necessarily high investment costs. This condition, however, is frequently not furnished, as for example, in the recovery of cadmium from liquors of discontinuous accumulating secondary crude materials (for example Ni-Cd cells). The separation by electrolysis, furthermore, does not take place completely; a portion of the cadmium remains in solution. Finally, the maximum possible nickel concentration in this case is limited by the requirement of a small nickel content (few grams per liter of nickel) in separating cadmium metal.

A further possibility for separating cadmium and nickel in the form of the aqueous solution of their salts consists of precipitating the cadmium sulfide with hydrogen sulfide in the acid range. In this case, however, the cadmium accumulates in the form of a product which is not easy to further work, i. e. to bring into solution. This method also is industrially expensive and, limited by two process steps, is loaded with high costs.

The cadmium, finally, can be separated from nickel out of the above mentioned solution by concen-tration. A disadvantage of this process is that the cadmium cement, especially at unfavorable cadmium/nickel ratios, is rich in nickel, that the problem of the cadmium/nickel separation merely is replaced by the problem of the separation of nickel from the concen-tration agent (for example, from zinc), which is still more difficult to solve than the original problem. Further, processes can be considered to be less as separation methods than as purification processes. Thus, it is possible to separate small amounts of nickel from cadmium salt solution by precipitation with sodium cyanide. A cadmium sulfate solution have 200 grams/liter of cadmium may thereby, however, contain no more than about 4 grams/liter of nickel. At higher nickel contents this process is no longer usable, since substantial amounts of cadmium are precipitated with the nickel as the cyanide.

The use of specific reagents to precipitate nickel as, for example, diacetyl dioxime are merely of laboratory interest or, are used on an industrial scale for the separation of traces of nickel.

The process of the invention distinguishes from the mentioned methods of the state of the art in that is requires no special apparatus, that cheap, large scale chemicals are used, that it is still usable at high nickel concentrations and that both metals accumulate in a form which is readily further workable, namely the cadmium as the carbonate and nickel as the hydroxide. The process, which closes a substantial void in this area of hydrometallurgy, is usable with mineral acids, preferably sulfuric acid solutions of both metals up to a concentration of about 200 grams per liter for the sum of Cd+Ni. The process is usable with as little as 10 grams per liter total Cd+Ni. The weight ratio Cd:Ni in the solution can range between 1:0.1 and 1:1 without impairing the separation effect. According to the process of the invention so much aqueous ammonia is added to the neutral cadmium-nickel solution with stirring at room temperature that the amount of ammonia added is in a fixed molar ratio to the nickel content.

In place of solutions of cadmium and nickel sulfates there can be employed cadmium and nickel salts of other strong mineral acids such as hydrochloric acid, hydrobromic acid and nitric acid.

The process is characterized in that ammonia is added to the solution containing a maximum of 200 g/l of cadmium and nickel. Then cadmium is precipitated as the carbonate by means of alkali carbonate, e. g. sodium carbonate or potassium carbonate. The amount of alkali carbonate added should be sufficient to precipitate all of the cadmium and is usually 0.7 to 1.4 moles per sum of the moles Cd + Ni.

The precipitated cadmium carbonate is filtered off and the nickel dissolved in the filtrate precipitated as the hydroxide by heating, preferably to boiling, with alkali hydroxide, e. g. sodium hydroxide or potassium hydroxide. Usually there are employed 2.1 to 2.3 moles of alkali hydroxide per mole of nickel.

The amount of ammonia depending on the nickel content in the concentration range of 10 g/l to 100 g/l Ni is varied between about 8 moles/l and about 4 moles/l.

An especially good separation effect is obtained if the amount of ammonia depending on the nickel content is chosen to correspond approximately to the equation $$y = x/(ax^2 + bx + c)$$

Where $y$ is the molar amount of $NH_3$, $x$ is the Ni concentration in g/l, $a$ is 0.000021, $b$ is 0.217 and $c$ is -1.09.

The practice, depending on the nickel concentration in the starting solution, there is selected the following dosages of ammonia based on 6 moles of $NH_3$ per gram atom Ni = 100%.

| Nickel Concentration g/l | $NH_3$ addition (%) |
|---|---|
| 50 to 100 | 80 |
| 25 to 49 | 90 |
| 20 to 24 | 100 |
| 15 to 19 | 110 |
| 10 to 14 | 120 |

An especially good separation can be attained if there is added to the solution of the metal salt prior to, or simultaneous with the addition of the ammonia the anion of the salt of the corresponding ammonium salt or aqueous ammonia together with the corresponding acid in an amount such that there is present in the solution a concentration of about 20 to 40 g/l, preferably about 30 g/l of the ammonium salt.

For precipitation of the cadmium carbonate there is most suitably employed a 10% excess of the alkali carbonate over the amount theoretically necessary for the precipitation of cadmium and nickel. The alkali carbonate can advantageously be added as a 20 percent solution although this is not critical and the alkali carbonate can be added at any desired concentration, e. g. from 5 to 50 percent.

There is also added to the starting solution, for example, 30 g/l of the ammonium salt corresponding to the anion of the dissolved salt as by adding the corresponding amounts of aqueous ammonia and mineral acid, the mixture is then stirred for about half an hour and then there is added sodium carbonate as a 20 percent solution in an amount equivalent to 110 percent for both metals. After an hour of stirring the cadmium carbonate can be filtered off and washed. There is obtained a carbonate containing 58 to 64% Cd and 0.5 to 2% Ni. In the filtrate there is found only about 2 percent of the cadmium inserted. If the ratio Cd:Ni lies in the region 1:1 the cadmium carbonate can contain up to 3.5% Ni and the filtrate can contain up to 4% Cd. The filtrate and wash water were united, treated with caustic soda and with expelling of the ammonia precipitated as the hydroxide in known manner. To improve the ability to filter the precipitate there can be suitably added some sodium carbonate (or potassium carbonate) in addition to the caustic soda and/or there can be stirred in prior to filtration a filter acid, for example, activated carbon. The nickel slurry contains about 70 percent water and in the dry material about 40 to 50% Ni.

Unless otherwise indicated all parts and percentages are by weight.

Example 1

To 2,600 liters of a cadmium-nickel sulfate solution at room temperature containing 77 grams per liter of Cd and 25.8 g/l Ni, there were added 460 liters of aqueous ammonia containing 230 g/l of $NH_3$ and 78 kilograms of ammonium sulfate. After stirring for one-half hour there were added 1,460 liters of a 20 percent sodium carbonate solution and the mixture stirred for one more hour. Then the cadmium carbonate was filtered off and washed until the wash water was colorless. The filtrate and wash water were combined and boiled with 87 kilograms of caustic soda until the nickel precipitated as the hydroxide. The nickel slurry was then filtered off with the addition of a filter acid (activated carbon). There resulted 312 kg. of cadmium carbonate (dry weight) containing 62.7% Cd and 1.1% Ni and 148 kg. nickel slurry (dry weight) containing 42.8% Ni.

Example 2

To 2,000 liters of cadmium-nickel sulfate at room temperature containing 142 g/l of cadmium and 15 g/l of nickel there were added 315 liters of aqueous ammonia having an ammonia content of 230 g/l and 25 liters of sulfuric acid (density 1.84) and the mixture stirred for one-half hour. Then there was added 1,520 liters of 20 percent sodium carbonate solution and the mixture stirred for one more hour. Finally the cadmium carbonate was filtered off and washed. The filtrate and wash water were united and after addition of 35 kg. of caustic soda boiled until the nickel was completely precipitated as the hydroxide and could be filtered off. There were obtained 435 kg. of cadmium carbonate (dry weight) containing 63.9% Cd and 0.8% Ni and 58 kg. nickel slurry (dry weight) containing 45.2% Ni.

Example 3

To 1,000 ml. of a cadmium-nickel chloride solution at room temperature containing 100 g/l of Cd and 100 g/l of Ni there were added 19 ml of hydrochloric acid (density 1.05) and 620 ml of aqueous ammonia containing 240 g/l $NH_3$. After stirring for one-half hour there were added 1,349 ml of a 20 percent sodium carbonate solution and the mixture stirred for one more hour. Finally the cadmium carbonate was filtered off and washed. The filtrate and wash water were united and after the addition of 128 grams of caustic soda heated until the nickel was completely precipitated and could be filtered off.

There were obtained (calculated on the dry basis) 165 grams of cadmium carbonate containing 58.5 % Cd and 3.4% Ni and 219 grams of nickel concentrate containing 43% Ni.

In the claims when reference is made to the addition of an ammonium salt of an acid, e. g. the ammonium salt of a strong mineral acid, it should be understood that this is intended to cover the addition of the salt as such, e. g. ammonium sulfate, or a mixture of the salt forming constituents, e. g. ammonia and sulfuric acid in the molar amounts of 2:1 to form ammonium sulfate in situ.

By the term "theoretically necessary to precipitate all of the cadmium and nickel" is meant that molar amounts of alkali metal carbonate to satisfy the equation, e. g. when the alkali metal carbonate is sodium carbonate

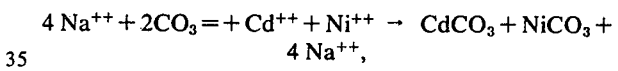
$$4 Na^{++} + 2CO_3 = +Cd^{++} + Ni^{++} \rightarrow CdCO_3 + NiCO_3 + 4 Na^{++},$$

i. e. one mole of alkali metal carbonate is required for each mole of cadmium carbonate and for each mole of nickel carbonate which could be formed. The above equation is for the theoretical reactions. Actually only the cadmium precipitates.

What is claimed is:

1. A process of separating cadmium and nickel from an aqueous solution of mineral acid salts from the group consisting of salts of HCl, HBr, $HNO_3$ and $H_2SO_4$ containing 10 – 100g/l of nickel and a maximum total of 200 g/l of nickel and cadmium comprising adding 8–4 moles per liter of ammonia, depending on the nickel content of the solution, precipitating the cadmium by adding an alkali metal carbonate and separating the precipitate from the nickel-containing solution.

2. A process according to claim 1 wherein the nickel remaining in solution is precipitated as the hydroxide by heating with alkali metal hydroxide.

3. A process according to claim 2 wherein the salts are salts of sulfuric acid or hydrochloric acid.

4. A process according to claim 3 wherein the salts are salts of sulfuric acid, the ratio of cadmium to nickel in the solution is from 1:0.1 to 1:1.

5. A process according to claim 2 wherein the amount of ammonia is selected to correspond to the equation $$y = x/(ax^2 + bx + c)$$

where $y$ is the molar amount of $NH_3$, $x$ is the nickel concentration in grams per liter, $a$ is 0.000021, $b$ is 0.217 and $c$ is $-1.09$.

6. A process according to claim 2 wherein there is added to the solution prior to the addition of the carbonate the ammonium salt of the mineral acid in an amount of 20 to 40 grams per liter.

7. A process according to claim 2 wherein the cadmium carbonate only is precipitated by adding the alkali metal carbonate in an amount of 10% over the amount theoretically necessary to precipitate all of the cadmium and nickel.

8. A process according to claim 7 wherein the alkali metal carbonate is added as a 20 percent solution.

9. A process according to claim 1 wherein the cadmium salt and the nickel salt are salts of the same mineral acid.

10. A process according to claim 1 wherein the mineral acid salts are salts of a member of the group consisting of sulfuric acid and hydrochloric acid, the ratio of cadmium to nickel in the solution is from 1 : 0.1 to 1 : 1.

11. A process according to claim 10 wherein the cadmium and nickel salts are both salts of sulfuric acid.

12. A process according to claim 10 wherein the cadmium and nickel salts are both salts of hydrochloric acid.

13. A process according to claim 10 wherein the cadmium and nickel salts are both salts of the same mineral acid and wherein there is added to the solution prior to the addition of the carbonate the ammonium salt of the same mineral acid in an amount of 20 to 40 grams per liter.

* * * * *